(12) United States Patent
Mintah et al.

(10) Patent No.: US 8,156,048 B2
(45) Date of Patent: Apr. 10, 2012

(54) ADAPTIVE PAYLOAD MONITORING SYSTEM

(75) Inventors: Brian Mintah, Washington, IL (US); Robert J. Price, Dunlap, IL (US); Kevin D. King, Peoria, IL (US); Vijayakumar Janardhan, Washington, IL (US); Shoji Tozawa, Kobe (JP)

(73) Assignee: Caterpillar Inc., Peoria, IL (US)

( * ) Notice: Subject to any disclaimer, the term of this patent is extended or adjusted under 35 U.S.C. 154(b) by 964 days.

(21) Appl. No.: 12/073,668

(22) Filed: Mar. 7, 2008

(65) Prior Publication Data
US 2009/0228394 A1   Sep. 10, 2009

(51) Int. Cl.
*G06F 19/00* (2006.01)
(52) U.S. Cl. ............ 705/50; 701/50; 702/101; 177/136; 177/139; 177/141; 177/146
(58) Field of Classification Search .................. 705/50; 701/50; 177/136, 139, 141, 146; 702/101
See application file for complete search history.

(56) References Cited

U.S. PATENT DOCUMENTS

| | | | |
|---|---|---|---|
| 4,035,621 A | 7/1977 | Kemp | |
| 4,805,086 A | 2/1989 | Nielsen et al. | |
| 4,919,222 A * | 4/1990 | Kyrtsos et al. | 177/139 |
| 4,945,221 A | 7/1990 | Nielsen et al. | |
| 4,995,468 A * | 2/1991 | Fukuda | 177/139 |
| 5,067,572 A * | 11/1991 | Kyrtsos et al. | 177/139 |
| 5,070,953 A * | 12/1991 | Kyrtsos et al. | 177/25.14 |
| 5,105,896 A * | 4/1992 | Kyrtsos | 177/139 |
| 5,220,968 A | 6/1993 | Weber | |
| 5,261,495 A | 11/1993 | Szymczak | |
| 5,268,834 A | 12/1993 | Sanner et al. | |
| 5,274,557 A | 12/1993 | Moriya et al. | |
| 5,357,424 A | 10/1994 | Kakizaki et al. | |
| 5,438,771 A | 8/1995 | Sahm et al. | |
| 5,446,980 A | 9/1995 | Rocke | |
| 5,493,798 A | 2/1996 | Rocke et al. | |
| 5,509,293 A * | 4/1996 | Karumanchi | 73/1.13 |
| 5,612,864 A | 3/1997 | Henderson | |
| 5,659,470 A | 8/1997 | Goska et al. | |
| 5,682,312 A | 10/1997 | Rocke | |
| 5,714,719 A | 2/1998 | Otsuka et al. | |

(Continued)

FOREIGN PATENT DOCUMENTS

WO    0113187    2/2001

*Primary Examiner* — Thomas Black
*Assistant Examiner* — Wae Louie
(74) *Attorney, Agent, or Firm* — Finnegan, Henderson, Farabow, Garrett & Dunner, LLP (57) ABSTRACT

A payload monitoring system for an excavation machine is disclosed. The payload monitoring system may have a tool, a first sensor configured to generate a first signal indicative of a velocity of the tool, and a second sensor configured to generate a second signal indicative of a lift force of the tool. The payload monitoring system may also have a controller in communication with the first sensor and the second sensor. The controller may be configured to record the velocity and the lift force of the tool during a work cycle based on the first and second signals, and partition the work cycle into a plurality of segments including a loaded moving segment. The controller may also be configured to determine a period of time within the loaded moving segment during which the velocity of the tool is substantially constant, and calculate a payload of the tool based on the lift force recorded during the period of time.

20 Claims, 4 Drawing Sheets

U.S. PATENT DOCUMENTS

| | | | |
|---|---|---|---|
| 5,764,511 A | 6/1998 | Henderson | |
| 5,824,965 A | 10/1998 | Fujii et al. | |
| 5,844,800 A * | 12/1998 | Brandt et al. | 700/97 |
| 5,864,060 A * | 1/1999 | Henderson et al. | 73/432.1 |
| 5,880,408 A | 3/1999 | Schreiner | |
| 5,925,085 A | 7/1999 | Kleimenhagen et al. | |
| 5,953,838 A | 9/1999 | Steenwyk | |
| 5,955,706 A | 9/1999 | Fonkalsrud et al. | |
| 6,047,228 A * | 4/2000 | Stone et al. | 701/50 |
| 6,076,030 A * | 6/2000 | Rowe | 701/50 |
| 6,114,993 A | 9/2000 | Henderson et al. | |
| 6,211,471 B1 * | 4/2001 | Rocke et al. | 177/136 |
| 6,518,519 B1 | 2/2003 | Crane, III et al. | |
| 6,552,279 B1 * | 4/2003 | Lueschow et al. | 177/141 |
| 6,601,013 B2 * | 7/2003 | Lueschow et al. | 702/175 |
| 6,691,010 B1 | 2/2004 | Gay | |
| 6,721,680 B2 * | 4/2004 | Sorrells et al. | 702/174 |
| 6,845,311 B1 | 1/2005 | Stratton et al. | |
| 6,858,809 B2 * | 2/2005 | Bender | 177/136 |
| 6,934,616 B2 | 8/2005 | Colburn et al. | |
| 7,003,386 B1 | 2/2006 | Ericsson et al. | |
| 7,079,931 B2 | 7/2006 | Sahm et al. | |
| 7,166,808 B2 * | 1/2007 | Viaud et al. | 177/1 |
| 7,276,669 B2 | 10/2007 | Dahl et al. | |
| 7,555,855 B2 * | 7/2009 | Alshaer et al. | 37/382 |
| 7,627,410 B2 * | 12/2009 | Berry et al. | 701/50 |
| 7,795,547 B2 * | 9/2010 | Hansen | 177/1 |
| 7,912,612 B2 * | 3/2011 | Janardhan et al. | 701/50 |
| 8,024,095 B2 * | 9/2011 | Mintah et al. | 701/50 |
| 2004/0267474 A1 * | 12/2004 | Drake et al. | 702/101 |
| 2005/0267713 A1 | 12/2005 | Horkavi et al. | |
| 2006/0100808 A1 * | 5/2006 | Lueschow et al. | 702/101 |
| 2006/0124323 A1 | 6/2006 | Glover et al. | 172/2 |
| 2007/0021895 A1 * | 1/2007 | Brandt et al. | 701/50 |
| 2007/0260380 A1 * | 11/2007 | Mintah et al. | 701/50 |
| 2009/0228394 A1 * | 9/2009 | Mintah et al. | 705/50 |

* cited by examiner

ADAPTIVE PAYLOAD MONITORING SYSTEM

TECHNICAL FIELD

The present disclosure relates generally to a monitoring system, and more particularly, to an adaptive payload monitoring system.

BACKGROUND

Excavation machines, for example hydraulic excavators, dragline excavators, wheel loaders, and front shovels, operate according to well known cycles to excavate and load material. A typical cycle includes a dig segment, a swing-to-truck segment, a dump segment, and a swing-to-trench segment. During each of these segments, the excavation machine performs differently. For example, during a dig segment, high forces and high precision are required to push a tool into the material at an optimum attack angle, while during a swing-to-truck or swing-to-trench segment, high velocities and low precision are required. As such, the excavation machine is often controlled differently according to what segment of the cycle is currently being completed. In addition, the way in which the machine is controlled during each segment can affect productivity of the machine, and the way that productivity is measured and analyzed.

A common way to measure productivity is to monitor the payload excavated and transported by the machine during each individual work cycle. Payload monitoring can be performed by way of pressure sensors or load cells associated with actuators and/or linkages that connect a tool of the excavation machine to a frame thereof. Based on the measured pressures or forces and on machine calibration, the weight of the material within the tool can be determined.

Although somewhat affective, measuring payload with pressure sensors or load cells can be difficult when the tool is moving. That is, the work cycle is typically not interrupted to perform the payload monitoring. As such, the payload must be monitored at the same time the tool is moving to complete the work cycle. When monitoring the tool during an active work cycle, care should be taken to minimize measurement error caused by movement of the tool (i.e., caused by changes in the velocity and/or acceleration of the tool). In addition, care should be taken to ensure that the dig segment of the work cycle is complete (i.e., filling of the tool for that particular work cycle is complete) and that the dump segment has not yet been initiated (i.e., no material has been intentionally lost prior to the monitoring).

One payload monitoring system that may be used during an active work cycle is disclosed in U.S. Pat. No. 5,714,719 (the '719 patent) issued to Otsuka et al. on Feb. 3, 1988. The '719 patent discloses a workload detecting system for excavating and loading apparatus. The workload detecting system includes a bottom pressure sensor detecting system for detecting a bottom pressure of a cylinder that vertically pivots a bucket, and a bucket earth and sand amount calculating system for calculating an earth and sand weight within the bucket on the basis of the detected bottom pressure. The bottom pressure sensor detecting system continuously measures the bottom pressure and calculates an average value of pressures monitored from 0.1 seconds before to 0.1 seconds after a time $T_d$. The time $T_d$ corresponds with a predetermined period of time (e.g., 2 seconds) ahead of a timing when a bucket dump signal is input. Then, on the basis of the averaged pressure, the bucket earth and sand amount calculating system calculates the bucket earth and sand weight by referencing a map stored in memory. By calculating the weight based on an average of pressures measured just before dumping occurs, the calculation may have high accuracy.

Although the system of the '719 patent may calculate payload at a generally reliable time during a typical work cycle to avoid negative influences, accuracy of the calculation could be improved. That is, the best time during the work cycle to calculate payload may not always be the same. Specifically, based on operator control, movement over uneven terrain, environmental conditions, and other uncontrollable factors, the window during which the most accurate measurements can be taken may shift. By limiting the measurements to a fixed time during each cycle, some of the measurements may lack accuracy. In addition, the system of the '719 patent fails to accommodate movement of the tool during the measurement time period.

The disclosed system is directed to overcoming one or more of the problems set forth above.

SUMMARY

One aspect of the present disclosure is directed to a payload monitoring system. The payload monitoring system may include a tool, a first sensor configured to generate a first signal indicative of a velocity of the tool, and a second sensor configured to generate a second signal indicative of a lift force of the tool. The payload monitoring system may also include a controller in communication with the first sensor and the second sensor. The controller may be configured to record the velocity and the lift force of the tool during a work cycle based on the first and second signals, and partition the work cycle into a plurality of segments including a loaded moving segment. The controller may also be configured to determine a period of time within the loaded moving segment during which the velocity of the tool is substantially constant, and calculate a payload of the tool based on the lift force recorded during the period of time.

Another aspect of the present disclosure is directed to a method of determining payload. The method may include sensing a velocity of a tool, sensing a lift force of the tool, and recording the velocity and the lift force of the tool during a work cycle. The method may also include partitioning the work cycle into a plurality of segments including a loaded moving segment, and determining a period of time within the loaded moving segment during which the velocity of the tool is substantially constant. The method may further include calculating a payload of the tool based on the lift force recorded during the period of time.

DETAILED DESCRIPTION

Figure 1:
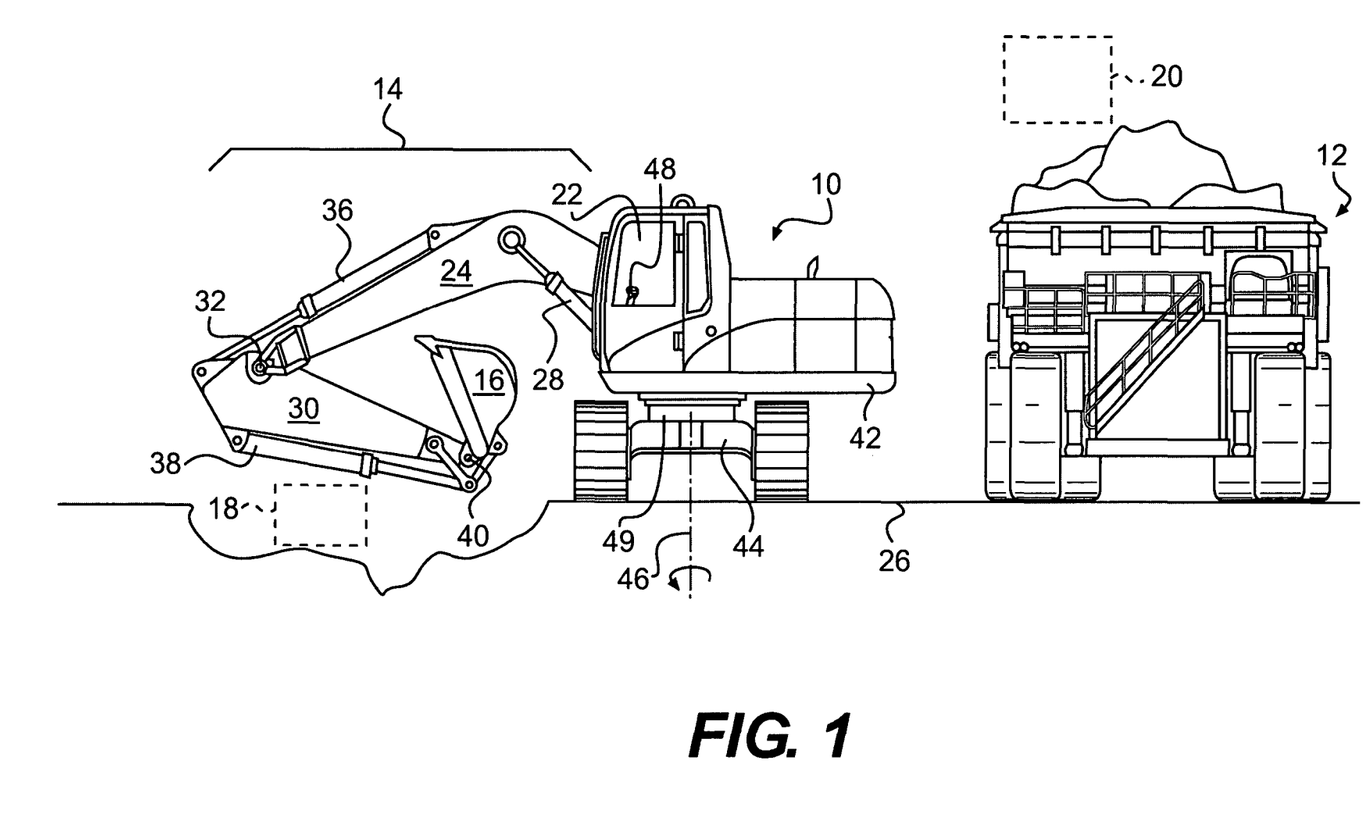
FIG. 1 is a diagrammatic illustration of an exemplary disclosed machine.

FIG. 1 illustrates an exemplary machine 10 having multiple systems and components that cooperate to excavate and load earthen material onto a nearby haul vehicle 12. In one example, machine 10 may embody a hydraulic excavator. It is contemplated, however, that machine 10 may embody another type of excavation machine such as a backhoe, a front shovel, a dragline excavator, or another similar machine. Machine 10 may include, among other things, an implement system 14 configured to move a work tool 16 between a dig location 18 within a trench and a dump location 20 over haul vehicle 12, and an operator station 22 for manual control of implement system 14.

Implement system 14 may include a linkage structure acted on by fluid actuators to move work tool 16. Specifically, implement system 14 may include a boom member 24 vertically pivotal relative to a work surface 26 by a pair of adjacent, double-acting, hydraulic cylinders 28 (only one shown in FIG. 1). Implement system 14 may also include a stick member 30 vertically pivotal about a horizontal axis 32 by a single, double-acting, hydraulic cylinder 36. Implement system 14 may further include a single, double-acting, hydraulic cylinder 38 operatively connected to work tool 16 to pivot work tool 16 vertically about a horizontal pivot axis 40. Boom member 24 may be pivotally connected to a frame 42 of machine 10. Frame 42 may be pivotally connected to an undercarriage member 44, and swung about a vertical axis 46 by a swing motor 49. Stick member 30 may pivotally connect boom member 24 to work tool 16 by way of pivot axes 32 and 40. It is contemplated that a greater or lesser number of fluid actuators may be included within implement system 14 and connected in a manner other than described above, if desired.

Numerous different work tools 16 may be attachable to a single machine 10 and controllable via operator station 22. Work tool 16 may include any device used to perform a particular task such as, for example, a bucket, a fork arrangement, a blade, a shovel, or any other task-performing device known in the art. Although connected in the embodiment of FIG. 1 to pivot and swing relative to machine 10, work tool 16 may alternatively or additionally rotate, slide, or move in any other manner known in the art.

Operator station 22 may be configured to receive input from a machine operator indicative of a desired work tool movement. Specifically, operator station 22 may include one or more operator input devices 48 embodied as single or multi-axis joysticks located proximal an operator seat (not shown). Operator input devices 48 may be proportional-type controllers configured to position and/or orient work tool 16 by producing a work tool position signal that is indicative of a desired work tool speed and/or force in a particular direction. The position signal may be used to actuate any one or more of hydraulic cylinders 28, 36, 38 and/or swing motor 49. It is contemplated that different operator input devices may alternatively or additionally be included within operator station 22 such as, for example, wheels, knobs, push-pull devices, switches, pedals, and other operator input devices known in the art.

Figure 2:
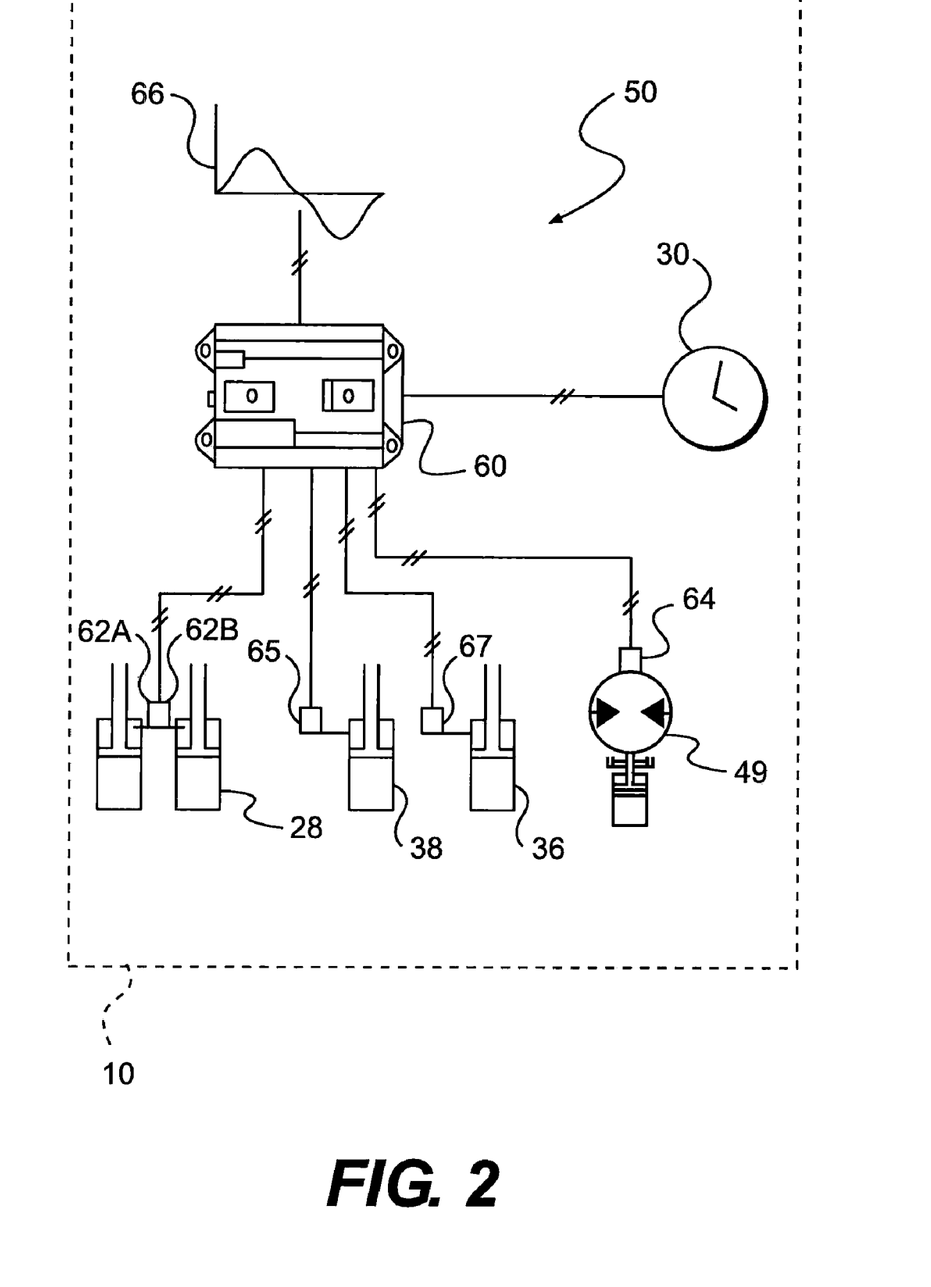
FIG. 2 is a schematic illustration of an exemplary disclosed control system that may be used with the machine of FIG. 1.

As illustrated in FIG. 2, machine 10 may include a control system 50 configured to monitor, record, and/or control movements of work tool 16 (referring to FIG. 1). In particular, hydraulic control system 50 may include a controller 60 in communication with a plurality of sensors. In one embodiment, controller 60 may be in communication with a first boom sensor 62A, a second boom sensor 62B, a swing sensor 64, a bucket sensor 65, and a stick sensor 67. Based on input received from these sensors, controller 60 may be configured to partition a typical work cycle performed by machine 10 into a plurality of segments, for example, into a dig segment, a swing-to-truck segment (i.e., a loaded swing segment), a dump segment, and a swing-to-trench segment (i.e., an empty swing segment), and to monitor a payload during a selected one of these segments, as will be described in more detail below.

Controller 60 may embody a single microprocessor or multiple microprocessors that include a means for performing an operation of control system 50. Numerous commercially available microprocessors can be configured to perform the functions of controller 60. It should be appreciated that controller 60 could readily embody in a general machine microprocessor capable of controlling numerous machine functions. Controller 60 may include a memory, a secondary storage device, a processor, and any other components for running an application. Various other circuits may be associated with controller 60 such as power supply circuitry, signal conditioning circuitry, solenoid driver circuitry, and other types of circuitry.

One or more maps 66 relating signals from sensors 62A, 62B, 64, 65, and 67 to the different segments of the typical excavation work cycle may be stored within the memory of controller 60. Each of these maps may include a collection of data in the form of tables, graphs, and/or equations. In one example, threshold speeds associated with the start and/or end of one or more of the segments may be stored within the maps. In another example, threshold forces associated with the start and/or end of one or more of the segments may be stored within the maps. In yet another example, a speed and/or a force of work tool 16 may be recorded into the maps throughout each excavation work cycle and subsequently analyzed by controller 60 during partitioning of the excavation work cycle. Controller 60 may be configured to allow the operator of machine 10 to directly modify these maps and/or to select specific maps from available relationship maps stored in the memory of controller 60 to affect cycle partitioning and/or payload monitoring. It is contemplated that the maps may additionally or alternatively be automatically selectable based on modes of machine operation, if desired.

First boom sensor 62A may be associated with the vertical pivoting motion of work tool 16 imparted by hydraulic cylinders 28 (i.e., associated with the lifting and lowering motions of boom member 24 relative to frame 42). Specifically, first boom sensor 62A may be an angular position or speed sensor associated with a pivot joint between boom member 24 and frame 42, a displacement sensor associated with hydraulic cylinders 28, a local or global coordinate position or speed sensor associated with any linkage member connecting work tool 16 to frame 42 or with work tool 16 itself, a displacement sensor associated with movement of operator input device 48, or any other type of sensor known in the art that may generate a signal indicative of a pivoting position or speed of machine 10. This signal may be sent to controller 60 throughout each excavation cycle. It is contemplated that controller 60 may derive a pivot speed based on a position signal from first boom sensor 62A and an elapsed period of time, if desired.

Second boom sensor 62B may be associated with the vertical pivoting force of work tool 16 imparted by hydraulic cylinders 28 (i.e., associated with the lift force of boom member 24 relative to frame 42). Specifically, second boom sensor 62B may be a pressure sensor associated with hydraulic cylinders 28 used to determine a force thereof based on a measured pressure or pressure differential, a strain gauge associated with the connection of boom member 24 to frame 42, a type of load cell, or any other device known in the art for monitoring a force and generating a signal in response thereto. This signal may be sent to controller 60 throughout each excavation cycle.

Swing sensor 64 may be associated with the generally horizontal swinging motion of work tool 16 imparted by swing motor 49 (i.e., the motion of frame 42 relative to undercarriage member 44). Specifically, swing sensor 64 may be a rotational position or speed sensor associated with the operation of swing motor 49, an angular position or speed sensor associated with the pivot connection between frame 42 and undercarriage member 44, a local or global coordinate position or speed sensor associated with any linkage member connecting work tool 16 to undercarriage member 44 or with work tool 16 itself, a displacement sensor associated with movement of operator input device 48, or any other type of sensor known in the art that may generate a signal indicative of a swing position or speed of machine 10. This signal may be sent to and recorded by controller 60 throughout each excavation cycle. It is contemplated that controller 60 may alternatively derive a swing speed based on a position signal from swing sensor 64 and an elapsed period of time, if desired.

Bucket sensor 65 may be associated with the pivoting force of work tool 16 imparted by hydraulic cylinder 38. Specifically, bucket sensor 65 may be a pressure sensor associated with one or more chambers within hydraulic cylinder 38, a strain gauge associated with the pivot connection between work tool 16 and stick member 3, a load cell, or any other type of sensor known in the art that generates a signal indicative of a pivoting force of machine 10 during a dig and dump operation of work tool 16. This signal may be sent to controller 60 throughout each excavation cycle.

Stick sensor 67 may be associated with the vertical pivoting force of work tool 16 imparted by hydraulic cylinder 36 (i.e., associated with the lift force of stick member 30 relative to boom member 24). Specifically, second stick sensor 67 may be a pressure sensor associated with hydraulic cylinder 36 used to determine a force thereof based on a measured pressure or pressure differential, a strain gauge associated with the connection of stick member 30 to boom member 24, a type of load cell, or any other device known in the art for monitoring a force and generating a signal in response thereto. This signal may be sent to controller 60 throughout each excavation cycle.

Figure 3:
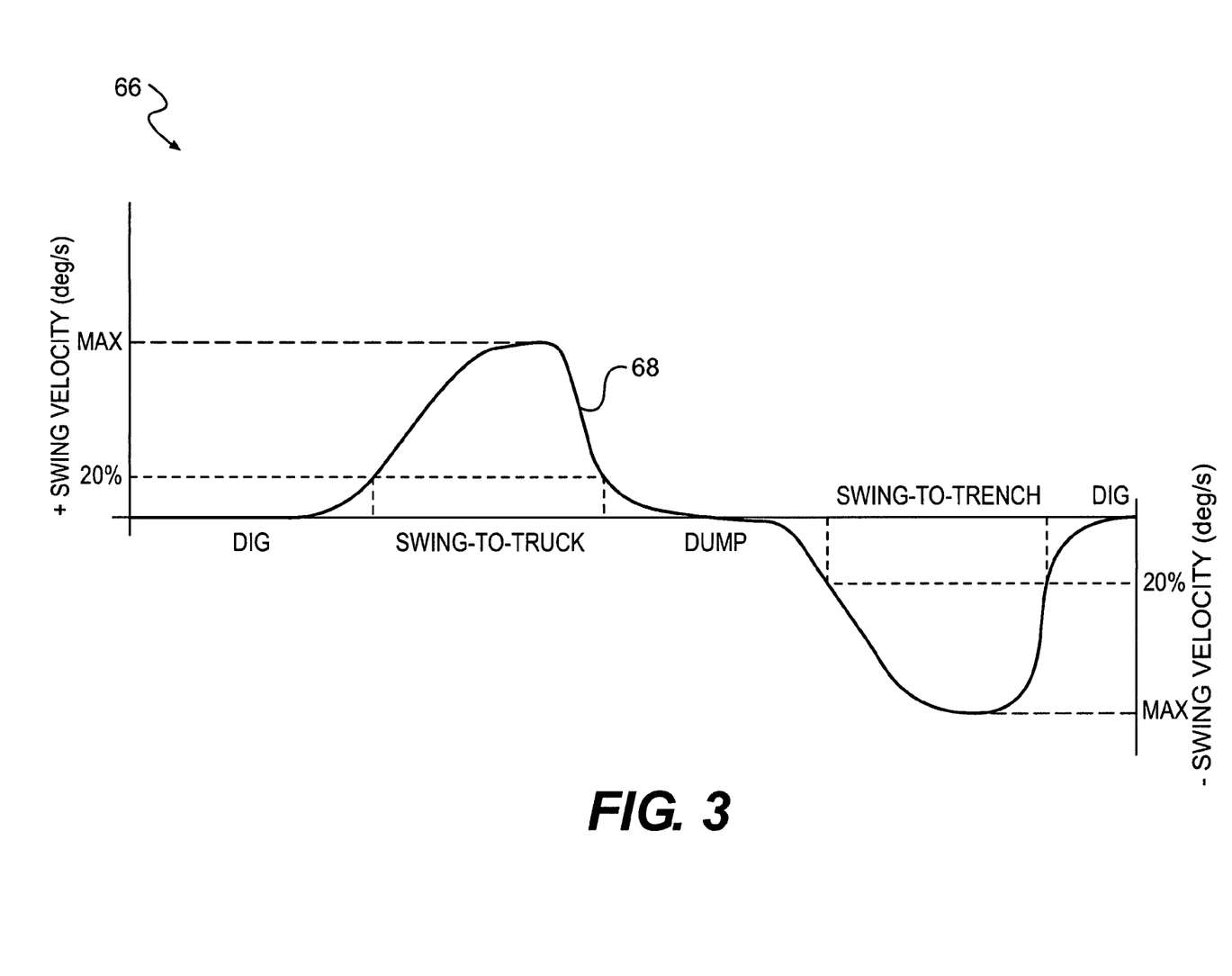
FIG. 3 is an exemplary disclosed control map that may be used by the control system of FIG. 2.

With reference to FIG. 3, a curve 68 may represent the swinging speed of machine 10 throughout each segment of the excavation work cycle, as recorded by controller 60 based on signals received from sensor 64. During most of the dig segment, the swing speed may typically be about zero (i.e., machine 10 may generally not swing during a digging operation). At completion of a dig stroke, machine 10 may generally be controlled to swing work tool 16 toward the waiting haul vehicle 12 (referring to FIG. 1). As such, the swing speed of machine 10 may begin to increase toward the end of the dig segment. As the swing-to-truck segment of the excavation work cycle progresses, the swing speed may reach a maximum when work tool 16 is about midway between dig location 18 and dump location 20, and then slow toward the end of the swing-to-truck segment. During most of the dump segment, the swing speed may typically be about zero (i.e., machine 10 may generally not swing during a dumping operation). When dumping is complete, machine 10 may generally be controlled to swing work tool 16 back toward dig location 18 (referring to FIG. 1). As such, the swing speed of machine 10 may increase toward the end of the dump segment. As the swing-to-trench segment of the excavation cycle progresses, the swing speed may reach a maximum in a direction opposite to the swing direction of the swing-to-truck segment. This maximum speed may generally be achieved when work tool 16 is about midway between dump location 20 and dig location 18. The swing speed of work tool 16 may then slow toward the end of the swing-to-trench segment, as work tool 16 nears dig location 18.

Controller 60 may partition a current excavation work cycle into the four segments described above based on signals received from sensors 62A, 64, and 65, and with reference to the swing speeds and pivot forces of machine 10 recorded for a previous excavation work cycle (i.e., with reference to curve 68 within map 66). Typically, controller 60 may partition the excavation work cycle based on at least three different conditions being satisfied, one condition associated with the swing motion measured by sensor 62A, one condition associated with the pivoting motion measured by sensor 64, and one condition associated with the pivot force measured by sensor 65. For example, controller 60 may partition the current excavation work cycle between the dig segment and the swing-to-truck segment when a current swing speed of machine 10 exceeds an amount of the maximum swing speed recorded during the previous swing-to-truck segment, when the pivot speed exceeds a threshold speed value, and when the pivot force is less than a threshold value. In one example, the amount may be about 20% of the maximum swing speed recorded during the previous swing-to-truck segment, while the threshold speed value may be about 5°/sec. The threshold pivot force may vary based on a size of machine 10 and an application thereof. It is also contemplated that the threshold pivot force, similar to the swing speed, may be based on the maximum force generated during a previously recorded cycle, if desired.

The excavation work cycle may be partitioned between the swing-to-truck segment and the dump segment in a manner similar to that described above. In particular, controller 60 may partition the current excavation work cycle between the swing-to-truck segment and the dump segment when a current swing speed of machine 10 slows to less than about 20% of the maximum swing speed recorded during the previous swing-to-truck segment, when the pivot speed slows to less than about 5°/sec, and when the pivot force exceeds a threshold value.

In contrast to the dig and swing-to-truck segments, the dump segment may be considered complete based on a current swing speed, a current pivot direction, and a pivot force, regardless of pivot speed. That is, controller 60 may partition the excavation work cycle between the dump segment and the swing-to-trench segment when a current swing speed of machine 10 exceeds about 20% of the maximum swing speed recorded during the previous swing-to-trench segment, when the pivot direction is toward dig location 18 (i.e., in a direction opposite from the pivot direction of the swing-to-truck segment or in the same direction as the pull of gravity), and when the pivot force is less than a threshold value. It should be noted that, although shown as a negative speed by curve 68, this negative aspect of the swing speed is simply intended to indicate a direction of the swing speed in opposition to the swing direction encountered during the swing-to-truck segment. In some situations, the maximum swing speeds of the swing-to-truck and swing-to-trench segments may have substantially the same magnitude.

Controller 60 may partition the swing-to-trench segment from the dig segment when a current swing speed of machine 10 slows to less than about 20% of the maximum swing speed recorded during the previous swing-to-trench segment, when the pivot speed is less than about 5°/sec, and when the pivot force is greater than a threshold amount. After this partition has been made, controller 60 may repeat the process with the next excavation work cycle that has already been recorded.

In some situations, it may be beneficial to index each excavation work cycle and/or each segment of each excavation work cycle according to an elapsed period of time or a particular time of the occurrence. In these situations, control system 50 may include a timer 70 in communication with controller 60. Controller 60 may be configured to receive signals from timer 70, and record performance information associated therewith. For example, controller 60 may be configured to record a total number of cycles completed within a user defined period of time, a time required to complete each cycle, a number of segments completed during the user defined period of time, a time to complete each segment, an occurrence time of each cycle, an occurrence time of each segment of each cycle, etc. Each work cycle may be considered completed after the occurrence and detection of each dump segment. This information may be utilized to determine a productivity and/or efficiency of machine 10.

Controller 60 may also be configured to dynamically determine a payload of work tool 16 based on signals from second boom sensor 62A, swing sensor 64, and stick sensor 67, and based on the partitioned work cycle. In particular, after partitioning the work cycle into the four segments described above, controller 60 may select the swing-to-truck segment (i.e., the loaded swing segment) for payload determination. By selecting the swing-to-truck segment for payload determination, controller 60 may help ensure that all of the material that will be loaded into work tool 16 has already been loaded (i.e., that the dig segment is complete), and that no material has been intentionally lost (i.e., that the dump segment has not yet been completed) prior to the determination. Controller 60 may then determine a sampling period within the swing-to-truck segment that may provide the most accurate payload determination.

Figure 4:
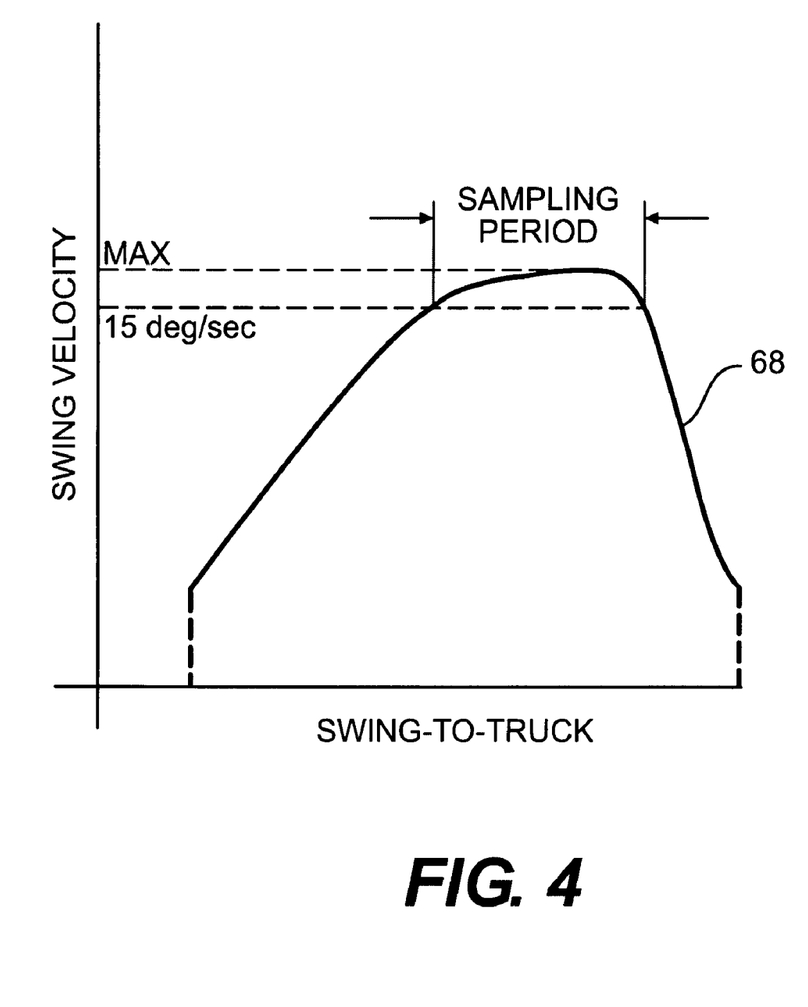
FIG. 4 is an exemplary portion of the control map illustrated in FIG. 3.

The sampling period may be the period of time within the swing-to-truck segment when the velocities of work tool 16 are substantially constant (i.e., when the swing velocity changes the least). As can be seen from curve 68, the swing velocity peaks at a point about halfway through the swing-to-truck segment, and the sampling period may be generally positioned about this point of maximum velocity. The sampling period may generally start and end at about the same velocities (i.e., the bounds of the sampling period may be associated with about the same velocity), and have a duration that varies based on the peak swing speed and a quality of payload samples taken during the sampling period. In one embodiment, the velocities at the start and end of the sampling period may be about 15 degrees/sec, and the number of quality payload samples required to accurately determine the payload of work tool 16 may be about 100.

Controller 60 may qualify each payload sample based on a predefined criteria. That is, although controller 60 may continuously sample the force signals from sensors 62B and 67 and the velocity signals from sensors 62A and 64, through post-processing after completion of the work cycle, controller 60 may only use those samples that meet the predefined criteria. In this manner, accuracy of the payload determination may be ensured. Thus, the sampling period may vary in duration, and the start and end velocities bounding the sampling period may change based on the total number of samples within the period required to produce 100 qualified samples. The predefined criteria may be associated with a number of directional changes of work tool 16 requested by an operator of machine 10, a velocity stability of boom member 24 and stick member 30, an extension status of hydraulic cylinders 28 and 36, and an amount of material spillage from work tool 16 during the sampling period. In one example, no directional changes may be requested or implemented during a qualified sample. In another example, the velocity of boom member 24 and stick member 30 must remain constant within a threshold amount during the qualified sample. In yet another example, hydraulic cylinders 28 and 36 may not be at an end stop during the qualified sample, or transitioning from a static friction condition. In a further example, the material spillage from work tool 16 must be less than a threshold amount during the qualified sample. The threshold amounts may vary and be based on a particular machine or application. Each sample taken by controller 60 that meets these criteria may be considered a qualified sample, and be used for payload determination.

Controller 60 may utilized the qualified samples to determine payload by reference to one or more maps stored within the memory of controller 60. Specifically, these maps may relate signals from sensors 62A, 62B, 64, and 67 that have passed the quality criteria outlined above to a payload of work tool 16. Each of these maps may include a collection of data in the form of tables, graphs, and/or equations. In one example, a force related value calculated as a function of the signals received from sensors 62B and 67, and a speed related value calculated as a function of signals from sensors 62A and 64 may be related to a payload value in the maps. In one embodiment, the function utilized to calculate the force related value may be an averaging function that takes into account the 100 qualified samples obtained during the sampling period. Similarly, the function utilized to calculate the velocity related value may be an averaging function that takes into account the 100 qualified samples obtained during the sampling period.

It is contemplated that, as machine 10 ages, is serviced or repaired, or components thereof are replaced, controller 60 may require calibration to help ensure accuracy in the payload determination. In one embodiment, calibration can be performed in-situ during a normal work cycle. That is, calibration may be performed during the swing-to-trench segment of the work cycle when work tool 16 is substantially empty. The calibration may be performed by determining a payload during the empty swing segment, and comparing the determined payload to the known weight of work tool 16 stored in memory of controller 60. Alternatively or additionally, a known weight may be loaded into work tool 16 during the calibration process, if desired.

INDUSTRIAL APPLICABILITY

The disclosed control system may be applicable to any excavation machine that performs a substantially repetitive work cycle, where knowledge about the payload moved during the work cycle is important. The disclosed control system may determine the payload dynamically without interrupting the work cycle by determining an optimal sampling period within the work cycle that may produce the most accurate values. The optimal sampling period may be selected during a loaded swing segment, when the velocities of work tool 16 are most stable.

Several benefits may be associated with the disclosed control system. First, because controller 60 may partition the excavation work cycle according to speeds and forces, and select only the loaded swing segment (i.e., the swing-to-truck segment) for payload determination, variability in the determination process may be accounted for. And, because controller 60 may choose the sampling period to correspond with the most stable velocities of work tool 16, the accuracy of the determination may be high. In addition, by adapting its sampling period based on changing control over machine 10, the accuracy of the partitioning may be maintained between work cycles.

It will be apparent to those skilled in the art that various modifications and variations can be made to the disclosed payload monitoring system. Other embodiments will be apparent to those skilled in the art from consideration of the specification and practice of the disclosed payload monitoring system. For example, although the disclosed system focuses on the sampling period being located around the peak swing velocity during the swing-to-truck segment, it is contemplated that payload monitoring may additionally or alternatively be performed during a start and/or an end of the swing-to-truck segment, when velocities may still be substantially stable, if desired. Similarly, rather than always determining the velocities corresponding to the most accurate time to monitor payload, it is contemplated that a position between the dig and dump locations corresponding to the optimal location or velocities for monitoring payload may alternatively be determined and utilized, if desired. It is intended that the specification and examples be considered as exemplary only, with a true scope being indicated by the following claims and their equivalents.

What is claimed is:

1. A payload monitoring system, comprising:
   a tool;
   a first sensor configured to generate a first signal indicative of a velocity of the tool;
   a second sensor configured to generate a second signal indicative of a lift force of the tool; and
   a controller in communication with the first sensor and the second sensor and being configured to:
   record the velocity and the lift force of the tool during a work cycle based on the first and second signals;
   partition the work cycle into a plurality of segments including a loaded moving segment;
   determine a period of time within the loaded moving segment during which the velocity of the tool is substantially constant; and
   calculate a payload of the tool based on the lift force recorded during the period of time.

2. The payload monitoring system of claim 1, wherein the velocity is in a swing direction substantially orthogonal to a direction of the lift force.

3. The payload monitoring system of claim 1, wherein the recorded velocity attains a maximum within the period of time.

4. The payload monitoring system of claim 3, wherein the velocities recorded at the bounds of the period of time are substantially equal for a given work cycle.

5. The payload monitoring system of claim 1, wherein a duration of the period of time varies continuously.

6. The payload monitoring system of claim 5, wherein the controller is further configured to average a threshold number of lift force samples taken during the period of time, wherein the duration of the period of time is a function of the threshold number and the velocity.

7. The payload monitoring system of claim 6, wherein the controller is further configured to qualify each lift force sample and expand the period of time until the threshold number of qualified lift force samples is obtained.

8. The payload monitoring system of claim 7, wherein the controller is configured to qualify each lift force sample based on at least one of an operator requested directional change of the tool, an extension status of at least one actuator associated with moving the tool, a stability of the tool movement, or an amount of payload spillage occurring at the time each lift force sample is taken.

9. The payload monitoring system of claim 6, wherein the threshold number is about 100.

10. The payload monitoring system of claim 1, wherein the controller has stored in memory a calibration map relating the first and second signals to a payload.

11. The payload monitoring system of claim 1, wherein the controller is configure to continuously monitor and record the velocity and the lift force of the tool during the work cycle, and post process the recorded velocity and lift force to determine the payload after completion of the work cycle.

12. The payload monitoring system of claim 1, wherein another of the plurality of segments includes an empty moving segment, and the controller is further configured to adjust payload calibration during the empty moving segment.

13. A method of determining payload, comprising:
   sensing a velocity of a tool;
   sensing a lift force of the tool;
   recording the velocity and the lift force of the tool during a work cycle;
   partitioning the work cycle into a plurality of segments including a loaded moving segment that occurs after and separate from a digging segment;
   determining a period of time within the loaded moving segment during which the velocity of the tool is substantially constant; and
   calculating a payload of the tool based on the lift force recorded during the period of time.

14. The method of claim 13, wherein the velocity is in a swing direction substantially orthogonal to a direction of the lift force.

15. The method of claim 13, wherein:
   the recorded velocity attains a maximum within the period of time; and
   the velocities recorded at the bounds of the period of time are substantially equal for a given work cycle.

16. The method of claim 13, further including:
   averaging a threshold number of lift force samples taken during the period of time; and
   qualifying each lift force sample based on at least one of an operator requested directional change of the tool, an extension status of at least one actuator associated with moving the tool, a stability of the tool movement, or an amount of payload spillage occurring at the time each lift force sample is taken.

17. The method of claim 13, wherein another of the plurality of segments includes an empty moving segment, and the method further includes adjusting payload calibration during the empty moving segment.

18. A machine, comprising:
   a tool;
   a linkage member pivotally connected to the tool;
   a first actuator configured to swing the linkage member in a first direction;
   a first sensor configured to generate a first signal indicative of a swing velocity of the tool;
   a second actuator configured to lift the linkage member in a second direction substantially orthogonal to the first direction;
   a second sensor configured to generate a second signal indicative of a lift force of the tool; and
   a controller in communication with the first sensor and the second sensor and being configured to:
   continuously record the swing velocity and the lift force of the tool during a work cycle based on the first and second signals;
   partition the work cycle into a dig segment, a loaded moving segment, a dump segment, and an empty moving segment;

determine a period of time within the loaded moving segment during which the velocity of the tool is substantially constant and attains a maximum; and calculate a payload of the tool based on a threshold number of qualified lift force samples recorded during the period of time after completion of the work cycle.

19. The machine of claim 18, wherein:

the velocities recorded at the bounds of the period of time are substantially equal for a given work cycle; a duration of the period of time varies continuously; and the controller is further configured to average a threshold number of lift force samples taken during the period of time, wherein the duration of the period of time is a function of the threshold number and the velocity.

20. The machine of claim 19, wherein:

the controller is further configured to qualify each lift force sample and expand the period of time until the threshold number of qualified lift force samples is obtained; and the controller is configured to qualify each lift force sample based on at least one of an operator requested directional change of the tool, an extension status of at least one actuator associated with moving the tool, a stability of the tool movement, or an amount of payload spillage occurring at the time each lift force sample is taken.

* * * * *